Oct. 4, 1966 H. H. JOHNSON 3,276,330
GAS PRESSURE TO LIQUID PRESSURE CONVERTING SYSTEMS
Filed Sept. 3, 1963 2 Sheets-Sheet 1

INVENTOR.
Henry H. Johnson

Oct. 4, 1966  H. H. JOHNSON  3,276,330
GAS PRESSURE TO LIQUID PRESSURE CONVERTING SYSTEMS
Filed Sept. 3, 1963  2 Sheets-Sheet 2
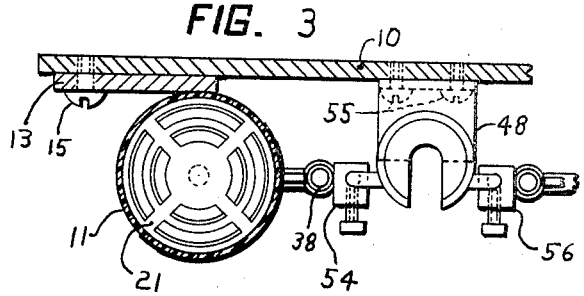
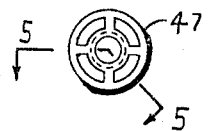
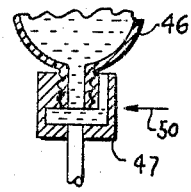
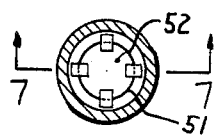
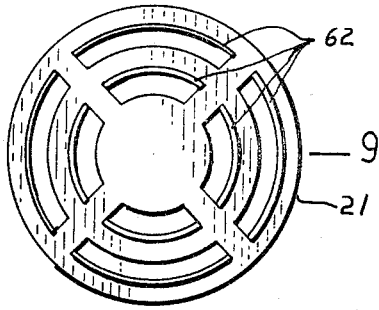
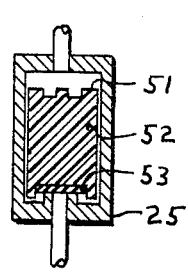
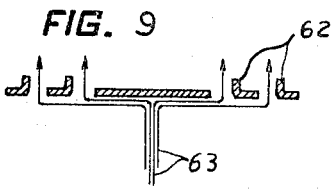
INVENTOR.
Henry H. Johnson

United States Patent Office 3,276,330
Patented Oct. 4, 1966

3,276,330
GAS PRESSURE TO LIQUID PRESSURE
CONVERTING SYSTEMS
Henry H. Johnson, 494 58th St., Oakland, Calif.
Filed Sept. 3, 1963, Ser. No. 306,095
7 Claims. (Cl. 91—4)

This invention relates in general to a system for putting liquid under pressure by using a gas under pressure and more particularly to a system for providing a liquid under pressure in a manner suitable to operate a hydraulic cylinder using a gas under pressure.

Gas-over-liquid, two chamber systems have been in use but have not used a way to determine liquid levels in each chamber, a way to determine proper operating liquid levels for efficient operation, a way to add liquid to the chamber during rapid alternating of pressure application to the chambers, a way to add liquid with minimum effort and minimum chance of contamination, a way to remove liquid easily and with minimum chance of contamination, a way to add and remove liquid from each chamber automatically, or a way to keep the liquid levels automatically in the proper operating range for efficient operation.

It is an object of this invention to provide a device which will provide liquid under pressure in a manner suitable to operate a hydraulic cylinder using a gas under pressure as a source of power, which requires a minimum of effort to keep liquid levels in each chamber in the proper range for efficient operation though there is leakage from the hydraulic cylinder or leakage of liquid from one side of the piston to the other.

A further object is to provide a device which introduces a minimum of gas bubbles in the liquid and is efficient without substantial loss of liquid and which is convenient to use, easy to adjust for lengthening and shortening the stroke of the hydraulic cylinder.

It is a further object to provide a device which has a minimum of parts affected by wear, has high reliability, low maintenance and long life.

Other objects and a fuller understanding of the invention may be had by referring to the following description and claims, taken in conjunction with the accompanying drawings in which:

FIG. 3 is a top view partly in section, showing the receptacle assembly for the make-up bottle.

FIG. 4 shows the top view of the bottle cap.

FIG. 5 shows the cross-sectional view of the bottle cap and partial section of the bottle.

FIG. 6 shows a cross-sectional, top view of the make-up check valve.

FIG. 7 is a cross-sectional, elevational view of a make-up check valve.

FIG. 8 is a top view of a lower baffle.

FIG. 9 is a cross-sectional view of the baffle, taken along line 9—9.

Figure 1:
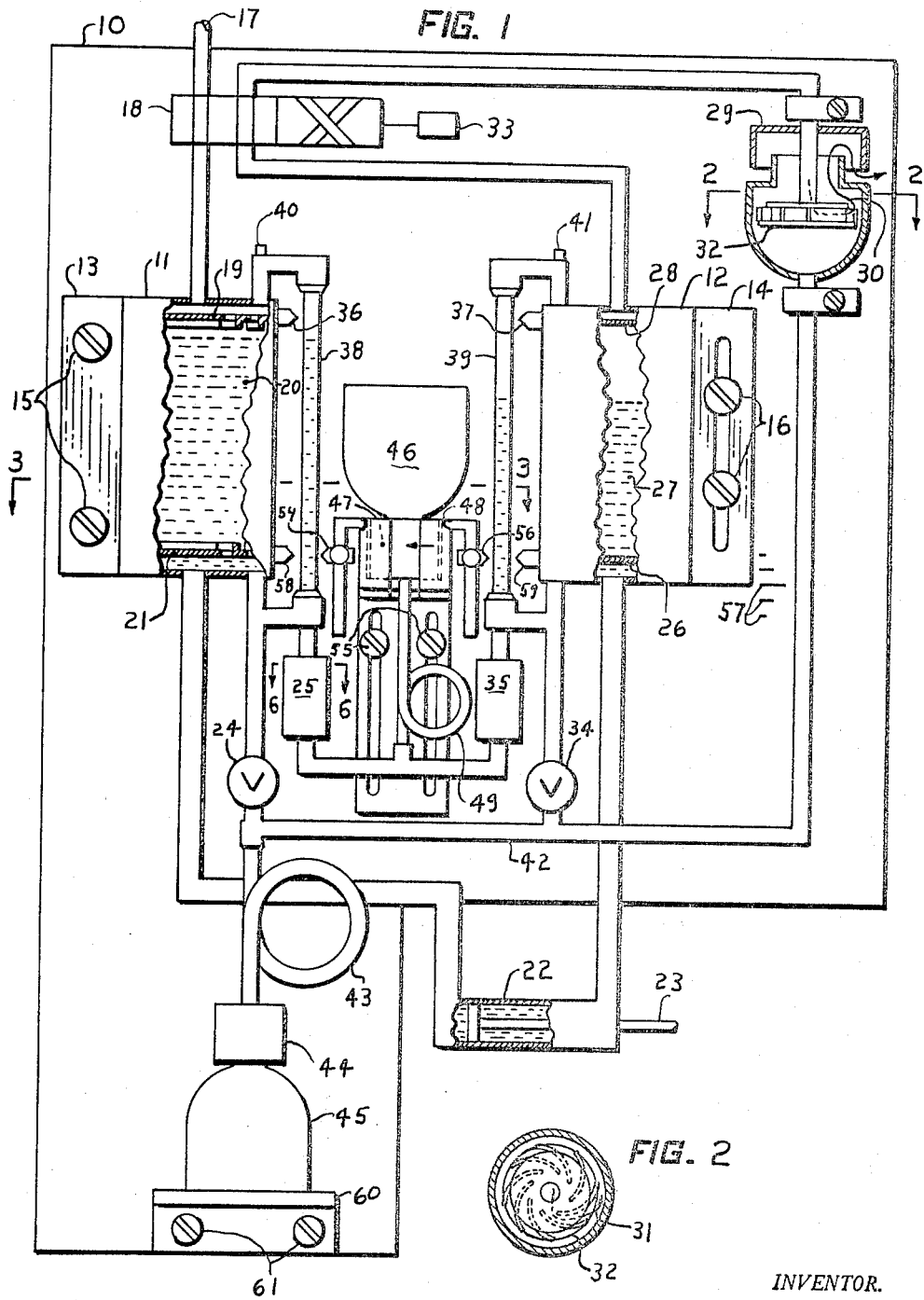
FIG. 1 is a schematic drawing of the invention.
Figure 2:
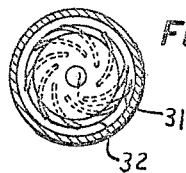
FIG. 2 is a cross-section top view of a liquid separator.

During normal operation, a gas under suitable pressure should be applied to 17, and when four-way valve 18 is in the position shown, gas will enter the top of chamber 11, go through baffle 19 and put liquid 20 under pressure. Liquid 20 can then go through baffle 21, through the bottom of chamber 11 and into hydraulic cylinder 22 to force piston rod 23 outward. Valve 24, which should be closed, and check valve 25, prevent liquid from leaving chamber 11 except to go into hydraulic cylinder 22. When piston rod 23 moves outward, liquid will flow from the piston rod side of hydraulic cylinder 22 into the bottom of chamber 12 and through baffle 26. Gas above liquid 27 in chamber 12 will flow through upper baffle 28, through the top of chamber 12, through four-way valve 18 and into liquid separator 29 where the gas can be vented to atmosphere by following the path indicated by arrow 30. Arrow 31 shows the path through the liquid separator head 32 in FIG. 2. When the desired end of the hydraulic cylinder stroke with the piston rod going out is reached, four-way valve 18 is shifted to the other position by actuator 33. Actuator 33 can be any type which is suitable for the hydraulic system used. Now gas will flow from 17 to put chamber 12 under pressure and gas in chamber 11 will be vented to atmosphere via valve 18 and liquid separator 29. Liquid 27 in chamber 12 will now be able to flow into the piston rod side of hydraulic cylinder 22 and force piston rod 23 to retract, and liquid on the other side of the piston will flow into chamber 11. Valve 34, which is closed, and check valve 35 prevent liquid from leaving chamber 12 except to go to hydraulic cylinder 22.

A measure of the efficiency of the device can be obtained by dividing the volume of liquid under pressure used by the volume of gas under pressure used during a cycle, which consists of an outward and an inward stroke of piston rod 23. The smallest volume of gas under pressure is used when the liquid in a chamber is closest to the top when gas under pressure is applied. If the liquid level in a chamber is too high, some liquid will leave through the top of the chamber during the part of the cycle when gas leaves that chamber. For highest efficiency without too much loss of liquid, the liquid level when it is at its highest must be kept quite close to high level indicator 36 on chamber 11 and 37 on chamber 12. A tube 38, through which liquid can be seen, provides a way to determine the liquid level in chamber 11, as does tube 39 for chamber 12. Liquid can be added to chamber 11 via filler plug 40 and to chamber 12 via 41. Liquid can be removed from chamber 12 by opening valve 34, and from chamber 11 by opening valve 24. After liquid leaves a chamber through either valve 24 or 34, it goes into line 42, then into flexible tube 43, then through vented cap 44 and into drain bottle 45. Vented cap 44 can be of the type shown in FIG. 4 and inverted from the position in FIG. 5 with the tube extending into the drain bottle 45 and with the outside diameter of the tube enough smaller than the smallest inside diameter of the bottle to permit gas to be vented from the bottle.

To keep the highest liquid level in chamber 11 in the operating range as indicated by high level indicator 36, even though there is leakage out of the hydraulic cylinder, an automatic make-up system is provided. This consists of make-up bottle 46 screwed into cap 47, which fits into receptacle assembly 48, flexible tube 49, and check valve 25 with connection to chamber 11. Liquid from make-up bottle 46 will be kept at the level as shown by arrow 50 in cap 47, best seen in FIG. 5. Though an inverted bottle is shown as a way to obtain constant liquid level, other means of obtaining a quite constant liquid level could be used and might be preferable especially in large systems. Check valve 25 (and 35) should be of the type which will permit liquid to flow in the free-flow direction with a small differential pressure and with a consistent pressure, and yet prevent liquid from flowing in the other direction. Such a check valve is shown in FIG. 6 and FIG. 7. The movable member 51, consists of a suitable plastic 52 of a density somewhat greater than that of the liquid used, and a soft seat 53. The soft seat can be neoprene or other suitable material, cemented or otherwise fastened to 52. The make-up system to chamber 12 is the same but the liquid will flow through check valve 35 instead of check valve 25.

For any set of conditions such as, specific gravity of liquid used, viscosity, time of chamber venting and rate of liquid rise in the chamber, there will be a head of liquid level 50 above the lowest liquid level in chamber 11 when liquid will flow into chamber 11. Pointer 54 should be adjusted on receptacle assembly 48, the distance of this head lower than liquid level 50. Pointer 54 will now indicate the automatically kept low liquid level, or preset level, in chamber 11. The head, or the height of level 50 above the preset level in a chamber, can be determined by experiment for a device used with a hydraulic cylinder under usual conditions. Thus pointer 54 could be set at the factory for the usual hydraulic system.

To set the automatic make-up system for a given hydraulic cylinder stroke, fill chamber 11 with liquid to high level indicator 36 when the hydraulic cylinder is at the end of its stroke with piston rod 23 retracted. Then fill chamber 12 to high level indicator 37 when the hydraulic cylinder is at the end of its stroke with piston rod extended. Now loosen screws 55 and adjust receptacle assembly 48 until pointer 54 is lined up with the low liquid level in chamber 11. With the same hydraulic cylinder stroke setting, the highest liquid level will always be in the range of the high level indicator 36 when the low liquid level is in line with pointer 54. If after operation long enough to determine steady state conditions the liquid level at its highest in chamber 11 is not at the correct level, adjust receptacle assembly 48 to obtain the desired correction.

Usually chamber 12 would be set at the same level as chamber 11 and pointer 56 would be set at the same level as pointer 54 and the low liquid levels in each chamber would be the same. Chamber 12 can be raised or lowered with respect to cylinder 11 by using screws 16 and slotted bracket 14. Graduations 57 on panel 10 facilitate adjustment and repeat setting of chamber 12 relative to chamber 11. If one make-up bottle with adjustable head for each chamber (or other means of adjusting liquid make-up head for each chamber) were used, the level of one chamber with respect to the other would not have to be adjustable. When the make-up head to each chamber is different (the chambers not at the same level) pointer 56 can be set at a different level than pointer 54 to reflect preset liquid level in each chamber. In hydraulic systems where the rate of travel of piston rod 23 from its inward end of the stroke is much faster than from its outward end of the stroke, chamber 12 might have to be lowered to compensate for the higher liquid level when chamber 12 is vented. If the relative rates of piston rod travel are reversed, chamber 12 would have to be higher than chamber 11 to obtain compensation.

A way to set-up the device in the field for a specific set of conditions is to adjust receptacle assembly 48 a little low (so pointer 54 will be below the low liquid level in chamber 11 when the high liquid level in chamber 12 is at the correct level) and operate the device. Now drain some liquid out of each chamber by opening valves 24 and 34 slightly for a time. This will make the liquid level at its lowest in each chamber low enough to make the make-up system add liquid to a stabilized low level in each chamber. Now note how much the liquid level at its highest in each chamber needs to be raised to be at the desired level. Raise receptacle assembly 48 the amount required to correct the level in chamber 11 and if the correction for chamber 12 is different, adjust the level of chamber 12 to obtain the additional correction required. If the high liquid level in each chamber is at the proper level and the low liquid level in chamber 11 or 12 falls below low level indicator 58 or 59 respectively, the hydraulic cylinder stroke volume is too large for the device.

When the cylinder stroke is shortened, for example when the distance the piston rod goes out is shortened, liquid levels will have to be changed. This is done by letting the piston rod go out to the new shortened length and then by raising receptacle assembly 48 until pointer 54 is at the new low liquid level in chamber 11. The make-up system will supply liquid to bring the liquid level to the proper level after a short time of operation. The liquid level in chamber 12 can be raised more quickly to the proper level (as indicated by pointer 56 when properly adjusted) by raising bottle 46 with cap 47 to increase the head when the piston rod is extended, chamber 11 is under pressure and chamber 12 is vented.

When the cylinder stroke is lengthened, for example the distance the piston rod goes out is lengthened, adjustment can be made by making the piston go out to the end of its lengthened stroke. Liquid will flow out of the top of chamber 12, through valve 18, into liquid separator 29, through line 42 and into drain bottle 45. Now lower receptacle assembly 48 to line pointer 54 up with the low liquid level in chamber 11.

The piston packing of many hydraulic cylinders, especially after a lot of use, has some leakage. In a two-chamber, gas-over-liquid system, this usually results in the net transfer of liquid from one chamber to the other, for example from chamber 12 to 11. Then the make-up system will supply liquid to chamber 12 and the excess liquid from chamber 11 will go into the drain bottle to keep liquid levels in both chambers at their proper operating levels.

By keeping some liquid in make-up bottle 46 at all times and by keeping drain bottle 45 from overflowing, the proper liquid level can automatically be kept in each chamber through there is liquid leakage out of the system or from chamber to chamber. Further liquid can automatically be added to, or removed from, a chamber as would be necessary to obtain proper operating liquid levels after shortening or lengthening the stroke of a hydraulic cylinder. This makes possible efficient operation of the device with only simple and infrequent attention. There is no necessity to stop operation to add liquid for make-up through filler plugs 40 and 41. Since the make-up bottle adds liquid as necessary with much less probability of contamination than when filling through a filler plug, the liquid will stay cleaner.

Convenience in adding liquid to make-up bottle 46 is provided by the design whereby cap 47 can be raised up while screwed to bottle 46, to drain out the last liquid in cap 47. Bottle 46 can then be unscrewed, filled and screwed into cap 47, while cap 47 is inverted from the position shown, then the bottle with cap 47 screwed on, inverted and placed into receptacle assembly 48. This reduces the chance of foreign material getting into the liquid and of spilling the liquid. If bottle 47 is identical to bottle 46, under conditions of substantially no liquid loss out of the system, the filled drain bottle could replace the near empty make-up bottle. Bracket 60, fastened to panel 10 by screws 61, supports the drain bottle.

One type of baffle is shown in FIGURES 8 and 9 and can be attached to the inside of the chamber wall. The baffle can be about ½ of the inside diameter of the pipe carrying liquid to and from the chamber and about ⅜ of the inside diameter of the inside diameter of the pipe carrying gas to and from the chamber. The baffles should be placed with the directors 62 (see FIG. 8) toward the inside of the chamber. This type of baffle makes the liquid (and gas) streams leave the baffle in multiple, spaced streams directed parallel to the longitudinal axis of the chamber at a very reduced velocity. The path of the liquid (or gas) tends to follow that indicated by arrows 63 in FIG. 9. This approaches an ideal condition where the liquid (or gas) in the chamber would flow at the same velocity throughout the cross-section of the chamber in a direction parallel to the longitudinal axis of the chamber. The baffles minimize entrapment of gas in the liquid and loss of liquid through the upper opening of the chamber with the high level of the liquid close to the top of the chamber, especially at high liquid (or gas) flow rates.

Many design changes could be made by those skilled in the art without departing from the spirit of the invention. For example, the chambers could have ends of the ASME, spherical, or other type. The general type of baffle shown could be used with a different chamber end by forming the baffle. The gas would normally be compressed air and would be vented to atmosphere, but could be any other suitable gas and could be in a closed system where gas from the liquid separator and from vent cap 44 would be at reduced pressure (like the inlet side of a compressor) from the pressure side connected to 17. While the drawing shows a hydraulic cylinder used with this device, those skilled in the art could use any other suitable system.

I claim:

1. A device for putting liquid under pressure in a manner suitable to operate a hydraulic cylinder by using a gas under pressure having, a pair of chambers, each containing some liquid and some gas, means of communication from the bottom of one chamber to one side of the hydraulic system and from the bottom of the other chamber to the other side of the hydraulic system, means of selecting communication from a gas under pressure to the top of either chamber and communication with atmosphere to the top of the other chamber, means connecting liquid to a chamber to add liquid to said chamber when the level in that chamber drops below a preset level, with means of adjusting said preset level in each chamber.

2. The invention as set forth in claim 1, with means to indicate the preset level of the liquid in one chamber.

3. The invention as set forth in claim 2, with means to change the preset level and the indication of the preset level of the liquid in both chambers simultaneously.

4. The invention as set forth in claim 2, with the means connecting liquid to a chamber to add liquid to said chamber when the level of the liquid in that chamber drops below a preset level, having a constant make-up head.

5. A device for putting a liquid under pressure in a manner suitable to operate a hydraulic cylinder by using a gas under pressure having, a pair of chambers, each chamber containing some liquid and some gas, means of communication from the bottom of one chamber to one side of the hydraulic system, means of communication from the bottom of the other chamber to the other side of the hydraulic system, a liquid separator, a drain container arranged to receive liquid from said separator, with means of selecting communication from a gas under pressure to the top of either chamber and communication of said liquid separator with the top of the other chamber, with means connecting liquid to a chamber of adding liquid to said chamber to keep the liquid above a preset level for that chamber, with means to indicate the preset level of liquid for one chamber, with means to adjust said preset level in one chamber.

6. The invention as set forth in claim 5, with means to adjust the preset level in one chamber without changing the preset level in the other chamber.

7. The invention as set forth in claim 5, with means to change the preset level and the indication of the preset level of the liquid in both chambers simultaneously.

References Cited by the Examiner

UNITED STATES PATENTS

| 386,116 | 7/1888 | Du Bois | 60—54.5 |
| 666,156 | 1/1901 | Ridgeway | 91—4 |
| 1,865,435 | 5/1932 | Eggert | 91—4 |
| 2,566,670 | 9/1951 | Lewis | 91—4 X |
| 2,918,928 | 12/1959 | Rednour | 137—114 |

FOREIGN PATENTS 1,103,594  5/1955  France.

MARTIN P. SCHWADRON, *Primary Examiner.*

FRED E. ENGELTHALER, SAMUEL LEVINE, *Examiners.*

P. T. COBRIN, *Assistant Examiner.*